July 10, 1951          J. F. TIPPS          2,560,141
MEANS FOR COOLING AND DRYING GRAIN AND SEED
Filed June 21, 1948          4 Sheets-Sheet 1

INVENTOR
JAMES F. TIPPS

July 10, 1951  J. F. TIPPS  2,560,141
MEANS FOR COOLING AND DRYING GRAIN AND SEED
Filed June 21, 1948  4 Sheets-Sheet 3

INVENTOR
JAMES F. TIPPS

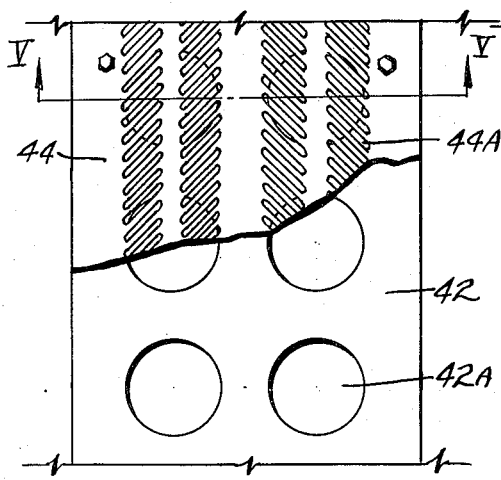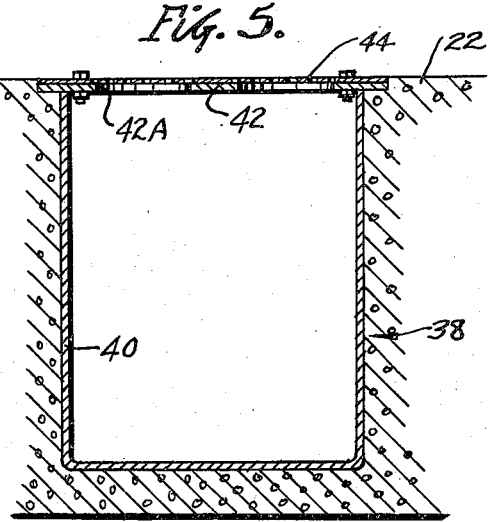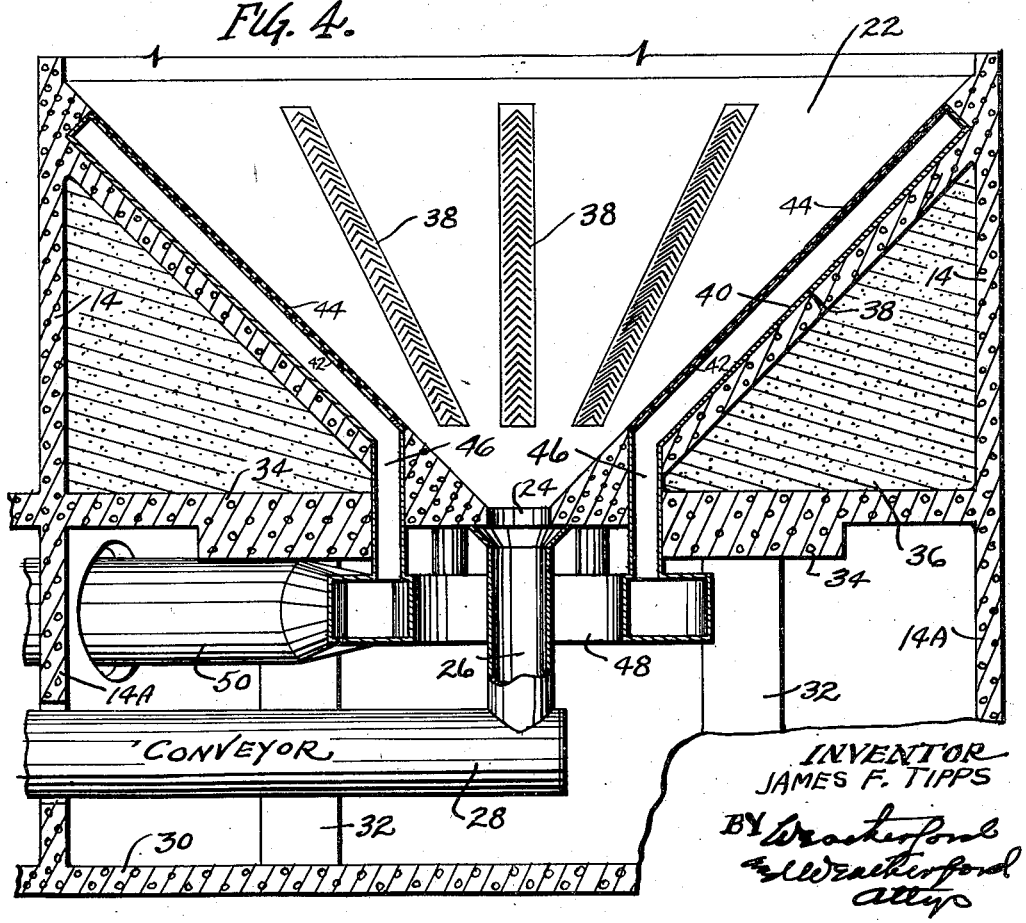

Patented July 10, 1951

2,560,141

UNITED STATES PATENT OFFICE 2,560,141

MEANS FOR COOLING AND DRYING GRAIN AND SEED

James F. Tipps, Memphis, Tenn.

Application June 21, 1948, Serial No. 34,333

6 Claims. (Cl. 98—55)

This invention relates to means for drying and cooling grains or other seeds stored in bins, in which moisture associated with the grain or seeds causes heating and destructive fermentation.

Grain or seeds when first harvested usually have so much associated moisture that preliminary drying is necessary and even then after storing, sweating and heating occur, which requires removal, redrying and storing, necessitating the provision of bins into which transfer may be made and greatly reducing the plant capacity. In the case of rice for example, it is found necessary, or at least advisable, to do the harvesting before the grain reaches a fully dry state, and, as a matter of fact, most harvesting is done before the rice is fully mature and while the grain itself has a very considerable moisture content. After harvesting and threshing, the rice is run, usually several times, through the dryer which not only is expensive but perhaps more important, limits the rate at which the grain can be received and handled into the storage bins. After drying and redrying the grain is stored in bins, usually of silo type, from which bins and grain may be discharged by gravity and removed by conveyors. During the storage period, and, as a matter of fact, often a number of times during storage, the moisture in the grain causes heating and tends to start fermentation which obviously is fatal if allowed to continue. As at present this usually requires that the grain must again be passed through the dryer.

To avoid this trouble aeration of the grain in the bins has been attempted by passing a current of air upward in what appears to be the obvious manner with the result that the upward current concentrates the moisture and becomes saturated adding to the moisture in the upper portion of the bin and in addition the moisture which is removed condenses on the underside of the protecting roof and forms rain which adds its damage to and may completely ruin the topmost content of the bin if not that which is underlying. Attempts may also have been made to pass air downward through the grain, but if so, the difficulties have not been overcome and so far as is known none have succeeded.

It has been found necessary, therefore, to reserve a number of the bins, usually some one-third of the total available, to permit shifting and aeration, and to shift and reshift the grain until by thorough aeration, heating stops. The necessity of these extra bins has made it necessary to greatly increase the storage capacity over that otherwise needed or conversely to reduce the capacity of such storage facilities as exist, and the expense incurred in the shifting is onerous.

The objects of the present invention are:

To provide means for removing moisture from grain or the like stored in bins;

To provide means for removing moisture from grain stored in bins by establishing a downward current of air through the mass of grain or seeds and separating the moisture laden air from the grain;

To provide means for exhausting air downward through a superposed mass of grain or seeds stored in a bin and separating the moisture laden air from the grain; and To improve the design and construction of the means for separating the moisture laden air from the grain.

The means by which the foregoing and other objects are accomplished, and the manner of their accomplishment, will readily be understood from the following specification on reference to the accompanying drawings, in which:

Fig. 4 is an enlarged sectional elevation of the hopper portion and underlying structure of one of the bins taken on the same line III—III of Fig. 1.

Fig. 5 is an enlarged cross section of one of the air channelways and screens, taken on the line V—V of Figs. 4 and 6; and Fig. 6 is a plan view showing a fragmentary portion of the same channelway, of the screen supporting cover member therefor, and of the overlying screen.

Figure 1:
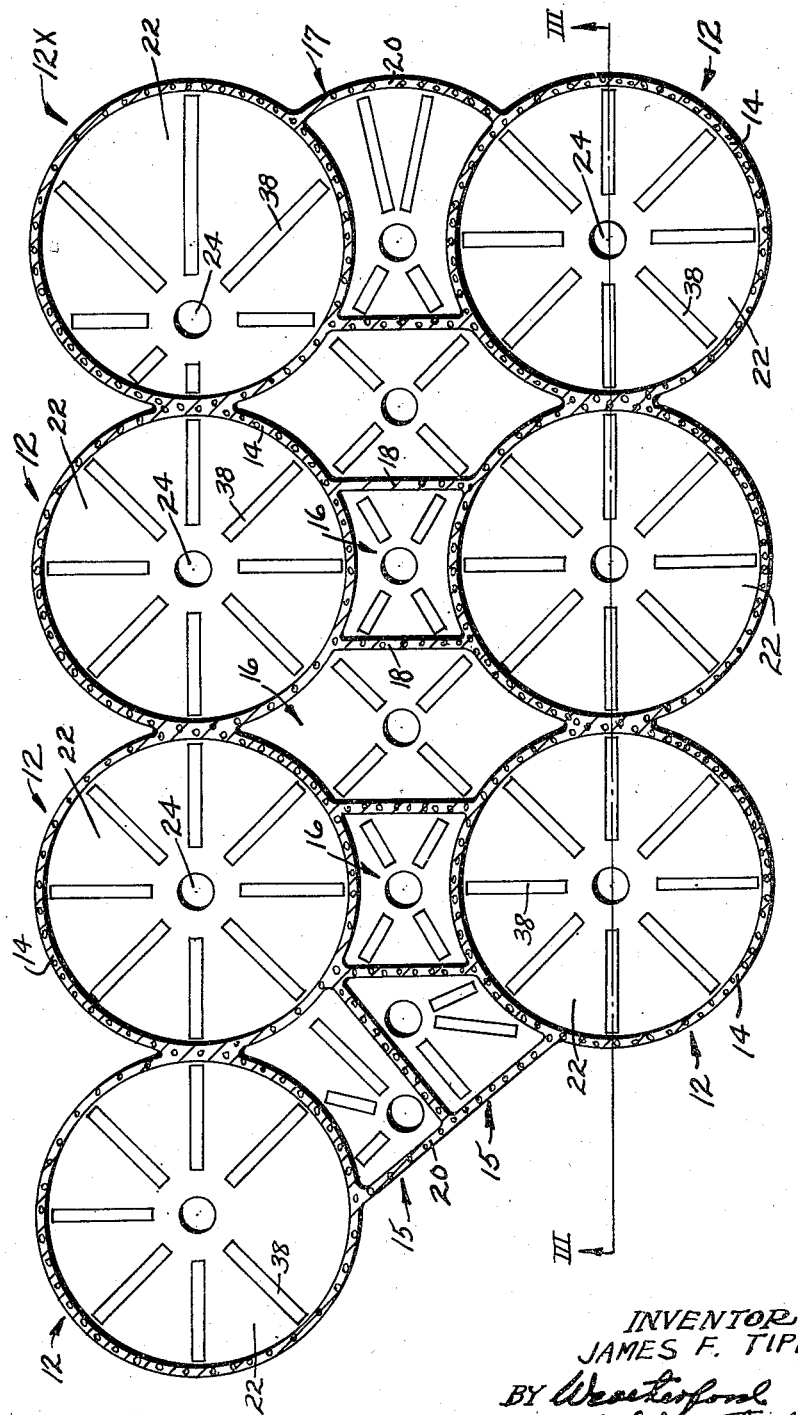
Fig. 1 is a sectional plan view taken as on the line I—I of Fig. 3 showing a typical arrangement of bins of usual type in an existing plant, with the bin floors modified in accordance with my invention, and the remaining views more fully illustrate the invention.
Figure 2:
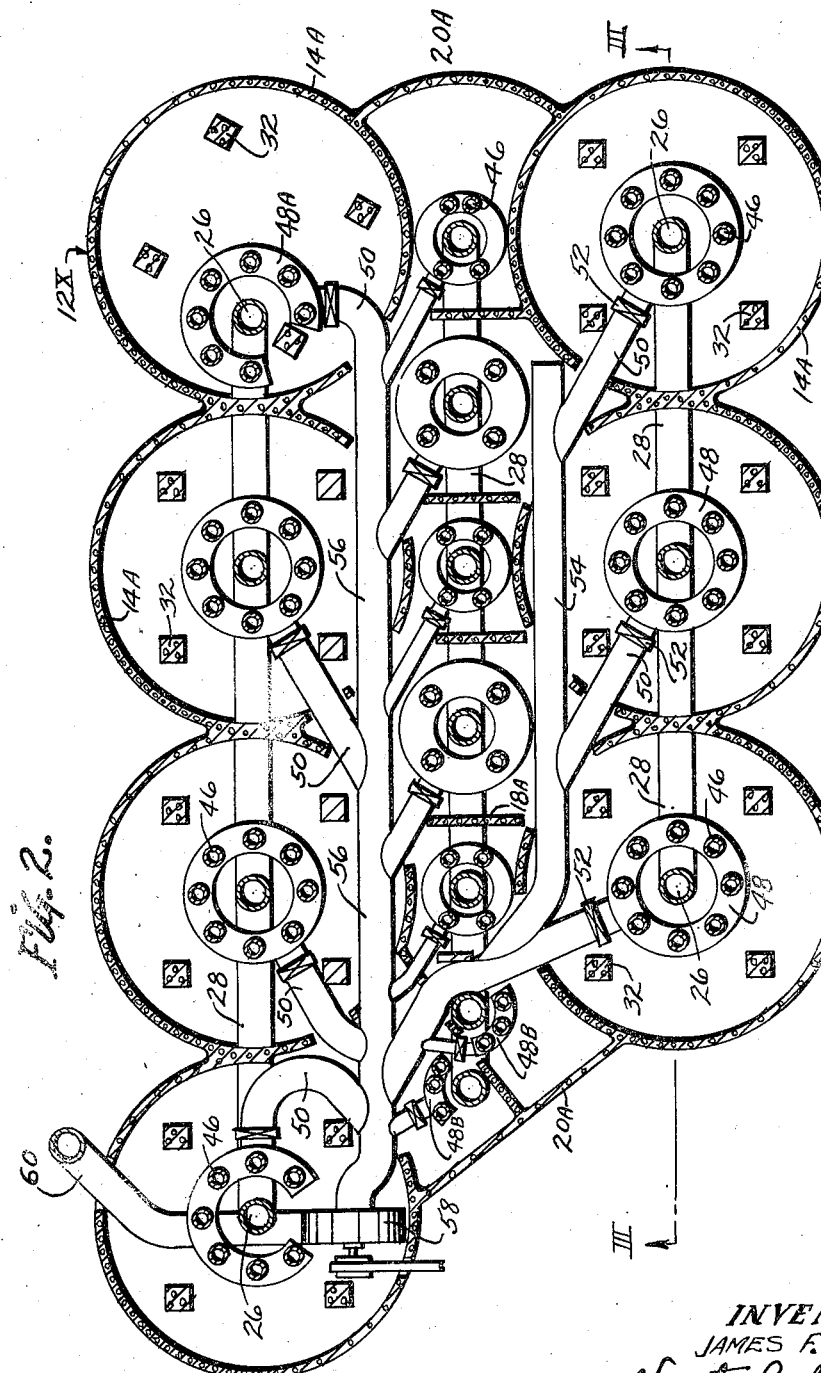
Fig. 2 is a sectional plan view of the same structure taken on the line II—II of Fig. 3.
Figure 3:
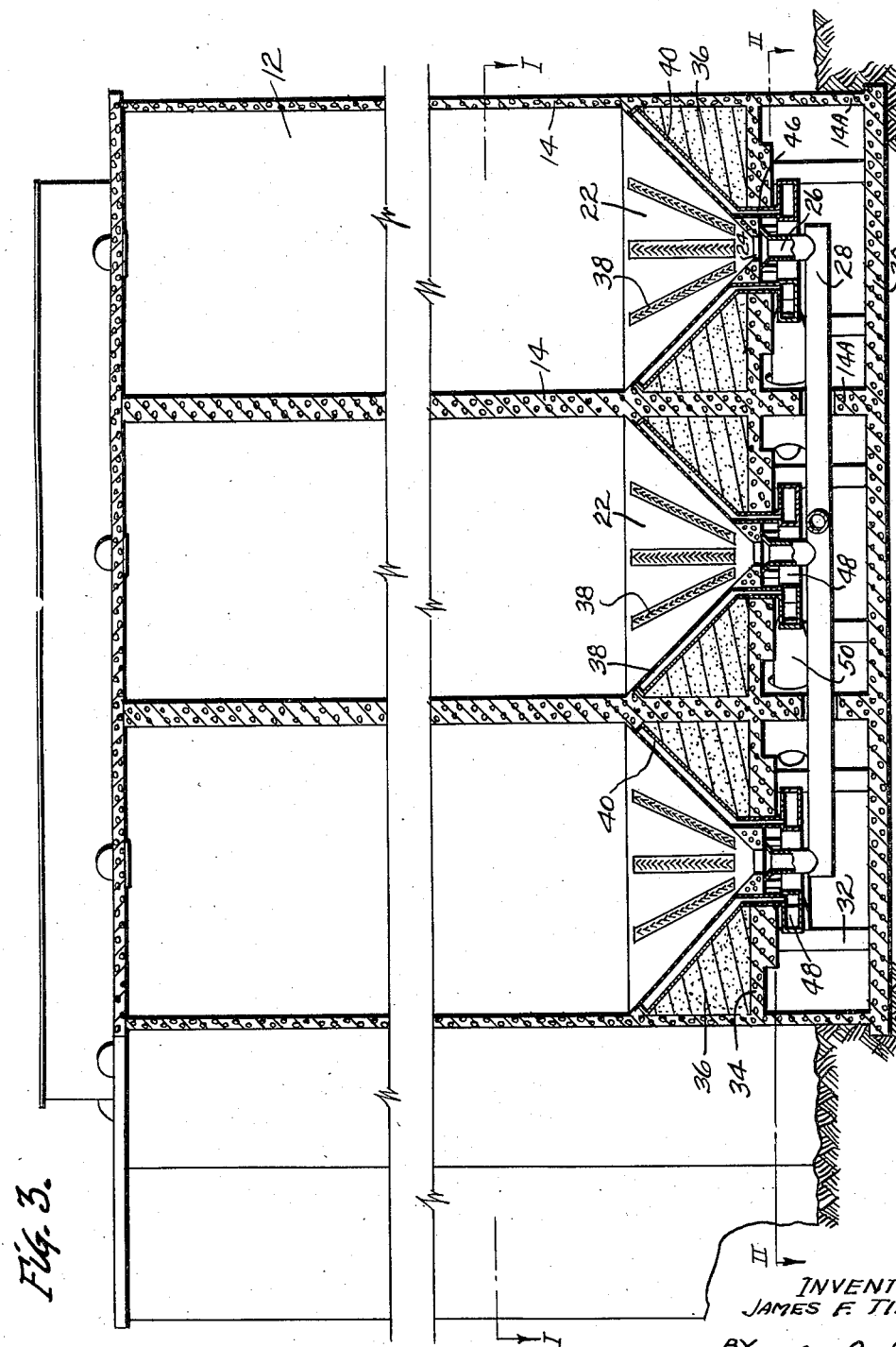
Fig. 3 is a sectional elevation taken on the line III—III of Fig. 1.

Referring now to the drawings in which the various parts are indicated by numerals: 12 are vertically disposed cylindrical bins of which seven are shown, the bins having walls 14; and 15, 16 and 17 are bins lying between the cylindrical bins, the bins 15, 16 and 17 having walls formed by parts of the cylindrical bin walls 14 with the addition of cross walls 18 and other walls 20. Each of the bins has a hopper bottom 22 converging downward to an opening 24 which leads into a downwardly extending discharge spout 26, the discharge spout emptying into a conveyor 28 through which removal of the grain from the bin is accomplished. The discharge openings preferably are in the centers of the various bins, but as in the case of the bin 12X, may be otherwise disposed.

The bins are preferably supported by a foundation 30 to which the footings 14A, 18A and 20A of the corresponding walls extend. Posts 32 extend upward from the footing and together with the wall footings 14A, 18A and 20A support an auxiliary floor 34 which in turn, within said bins, carries sand fillers 36 which in part support the downwardly converging floors 22.

The bins are filled through the top by elevators and conveyors, but these form no part of the present invention and are not shown.

The construction so far described is typical of standard silo type bin construction, and the detail of the discharge spouts and conveyors also forming no part of the present invention are not, therefore, shown.

In accordance with the present invention channelways 38 are formed in the floor 22 of each bin. These channelways at their inner ends are spaced somewhat away from the discharge opening 24, and the one from the other, leaving uninterrupted portions of the floor therebetween and radiate outward and upward substantially to the walls 14, 18 or 20, as the case may be, of the bins.

Preferably the channelways are provided with a trough-like metal lining 40, but whether lined or not, are provided with overlying screen support members 42 which span from side to side and are of strength to support the grain in the bin. The support members are overlaid with screens 44, of which the openings are preferably elongated slots 44A of less width than the smallest diameter of the grain, the underlying support members 42 having relatively much larger openings 42A therethrough. The support members preferably are of sheet metal and openings 42A therethrough preferably circular, though such form is not governing and may be varied from so long as the members perform the function of efficiently supporting the screens while maintaining ready passage of the air. Preferably the screens are metal sheets perforated as by punching with as smooth upper surfaces as their slotted nature permits. Preferably also the slots are arranged in herringbone pattern. From the lower ends of each of the channelways 38 respectively individual tubular connections 46 extend downward into a hollow drum 48, preferably annular, which is disposed around the related discharge spout 26.

Each of the bins is provided with the channelways and drum. Where bin construction permits the drums are preferably complete rings, but less than a complete ring may be employed as the drum 48A of the bin 12X, or the drum sectors 48B of the bin 15. The drums are connected through individual exhaust flues 50, each respectively provided with a cutoff valve 52, into trunk flues 54 and 56 and through these trunk flues into an exhaust fan 58 which discharges through a pipe 60 into the atmosphere. The drums and drum sectors except as to the tubular connections 46 thereinto and the exhaust flues 50 therefrom are hermetically sealed structures and all flue connections are necessarily substantially air tight.

In use the bins are filled and the grain subsequently drawn therefrom in usual manner. During the storage period the valve 52 of any one of the exhaust flues 50 may be opened, the exhaust fan 58 put in operation and air drawn downward through the grain stored in the related bin and through the screen surfaces 44 of the channelways 38 into the channelways. From these channelways the air passes through the tubular connections 46 into the related drum 48, and through the connecting flue 50 into the fan 58 and is discharged thereby into the atmosphere. The air drawn downward through the grain removes moisture therefrom and removal and discharge of the air disposes of the moisture. In removing the moisture should its concentration be excessive the weight of the water itself tends to assist, rather than retard, its removal. The operation is continued until check of the air discharged by the fan shows the moisture content has been sufficiently removed at least for the time being. The bins are preferably treated one at a time, though in the case particularly of the smaller bins more than one can be worked on. Obviously at any time a bin may be additionally dried out should this appear necessary or desirable.

In the installation illustrated though two trunk flues 52, 54 are shown and only one fan 58, it will readily be understood that each trunk flue may individually be equipped with a fan or even that individual fans may be used for single bins if so desired and multiple bins be under drying and cooling action at the same time.

I claim:

1. Grain drying means for a vertically disposed storage bin, which bin includes walls, a hopper-type floor having a discharge opening, and converging downward from said walls to said opening; said drying means comprising open top channelways formed in said floor, each said channelway respectively having a screen-like cover of mesh to prevent entry of grain into said channelway, said channelways being disposed in spaced relation around, and radiating outward and upward from said discharge opening toward said walls, an annular hollow drum disposed around said opening below said floor, tubular means respectively connecting said channelways into said drum, an exhaust fan and an exhaust flue connecting said drum and said fan.

2. Grain drying means for a vertically disposed storage bin, which bin includes walls, a hopper-type floor having a discharge opening, and a discharge spout leading downward from said opening; said floor converging downward from said walls to said opening; said drying means comprising open top channelways formed in said floor, each said channelway respectively having a screen-like cover of mesh to prevent entry of grain into said channelway, said channelways being disposed in spaced relation to said opening and the one to the other, an annular hollow drum disposed around said opening below said floor, tubular means respectively connecting said channelways into said drum, an exhaust fan and an exhaust flue connecting said drum and said fan.

3. Grain drying means for a group of vertically disposed storage tanks, each of which includes walls, a substantially conical hopper-type floor having a discharge opening and converging downward from said walls to said opening, and a discharge spout leading downward from said opening; said drying means comprising for each said tank respectively open top channelways formed in said bottom, each said channelways respectively having a screen-like cover substantially flush with the surface of said bottom and of mesh to prevent entry of grain into said channelway, said channelways being disposed in spaced relation around, and radiating outward and upward from, said discharge spout toward said walls, an annular hollow drum disposed around said spout below said bottom, and tubular means respectively connecting said channelways into said drum; and exhaust fan, a tubular exhaust trunk connecting into said fan, and exhaust tubes, each respectively interconnecting a said drum and said exhaust trunk, each said exhaust tube respectively being provided with a manually operable cutoff valve.

4. Grain drying means for a vertically disposed storage bin, which bin includes walls, a substantially conical hopper-type bottom having a discharge opening, and converging downward from said walls to said opening; said drying means comprising open top channelways formed in said bottom, each said channelway respectively having an overlying screen supporting member spanning from side to side thereof, and a screen overlying and supported by said member, said screen being of mesh to prevent entry of grain into said channelway, and said supporting members having relatively much larger openings to reduce interference with air flow therethrough, said channelways being disposed in spaced relation around said opening and with relation the one to the other, an arcuate hollow drum disposed below said bottom and around said discharge opening, tubular means connecting said channelways into said drum, an exhaust fan and an exhaust flue connecting said drum and said fan.

5. Grain drying means for a silo type vertically disposed storage bin, which bin includes walls, a hopper-type floor having a discharge opening, said floor converging downward from said walls to said discharge opening; said drying means comprising open top channelways formed in said bottom, each respectively having a substantially U-shaped trough-like lining disposed with the legs of the U extending upward, an apertured plate-like screen supporting member carried by and spanning between said legs and a screen overlying and supported by said member, said screen being substantially flush with the surface of said bottom and being of mesh to prevent entry of grain into said trough and said member apertures being of relatively much greater size to reduce interference with air flow therethrough; said channelways being disposed in spaced relation around and radiating outward and upward from said opening, a hollow drum disposed below said bottom, and around said opening, tubular means connecting said channelways into said drum, an exhaust fan and an exhaust flue connecting said drum and said fan.

6. Grain drying means for a silo type vertically disposed storage bin, which bin includes walls, a hopper-type floor having a discharge opening, said floor converging downward from said walls to said discharge opening; said drying means comprising open top channelways formed in said bottom, each respectively having a substantially U-shaped trough-like lining disposed with the legs of the U extending upward, an apertured plate-like screen supporting member carried by and spanning between said legs and a screen overlying and supported by said member, said screen being of mesh to prevent entry of grain into said trough and said member apertures being of relatively much greater size to reduce interference with air flow therethrough; said channelways being disposed in spaced relation around and radiating outward and upward from said opening; a hollow drum disposed arcuately around said opening, an exhaust fan and tubular means connecting said drum and said fan.

JAMES F. TIPPS.

REFERENCES CITED

The following references are of record in the file of this patent:

UNITED STATES PATENTS

| Number | Name | Date |
|---|---|---|
| 508,363 | Blair | Nov. 7, 1893 |
| 1,102,714 | Bornmann | July 7, 1914 |
| 1,334,235 | Eckhardt | Mar. 16, 1920 |
| 2,027,268 | Davis | Jan. 7, 1936 |
| 2,336,378 | Uhlig | Dec. 7, 1943 |